G. J. SMITH.
POTATO PLANTER.
APPLICATION FILED APR. 1, 1918.

1,312,214.

Patented Aug. 5, 1919.
3 SHEETS—SHEET 1.

Inventor

George J. Smith,

By

Attorney

G. J. SMITH.
POTATO PLANTER.
APPLICATION FILED APR. 1, 1918.
1,312,214.
Patented Aug. 5, 1919.
3 SHEETS—SHEET 2.
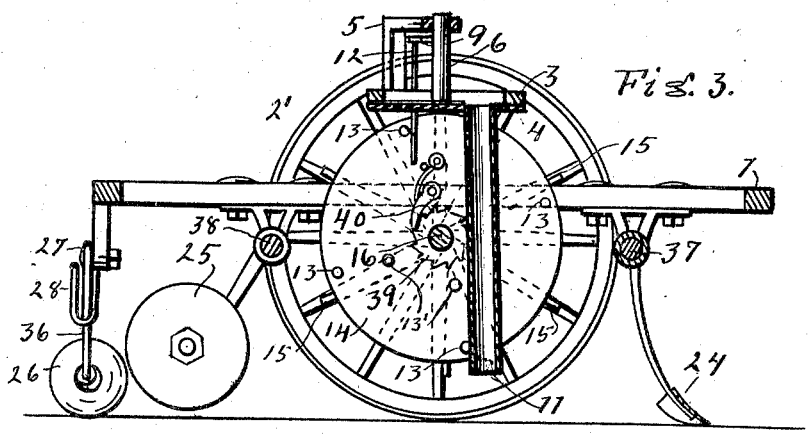
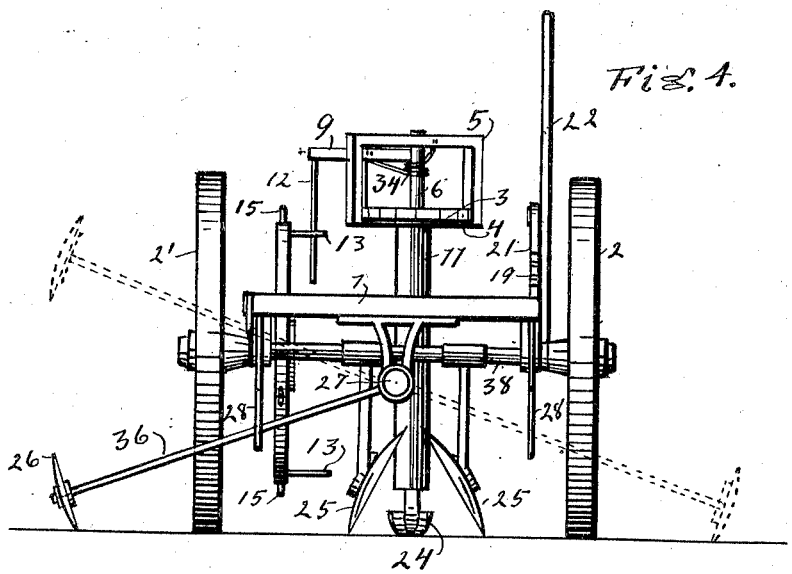
Inventor
George J. Smith
By
Attorney G. J. SMITH.
POTATO PLANTER.
APPLICATION FILED APR. 1, 1918.
1,312,214.
Patented Aug. 5, 1919.
3 SHEETS—SHEET 3.
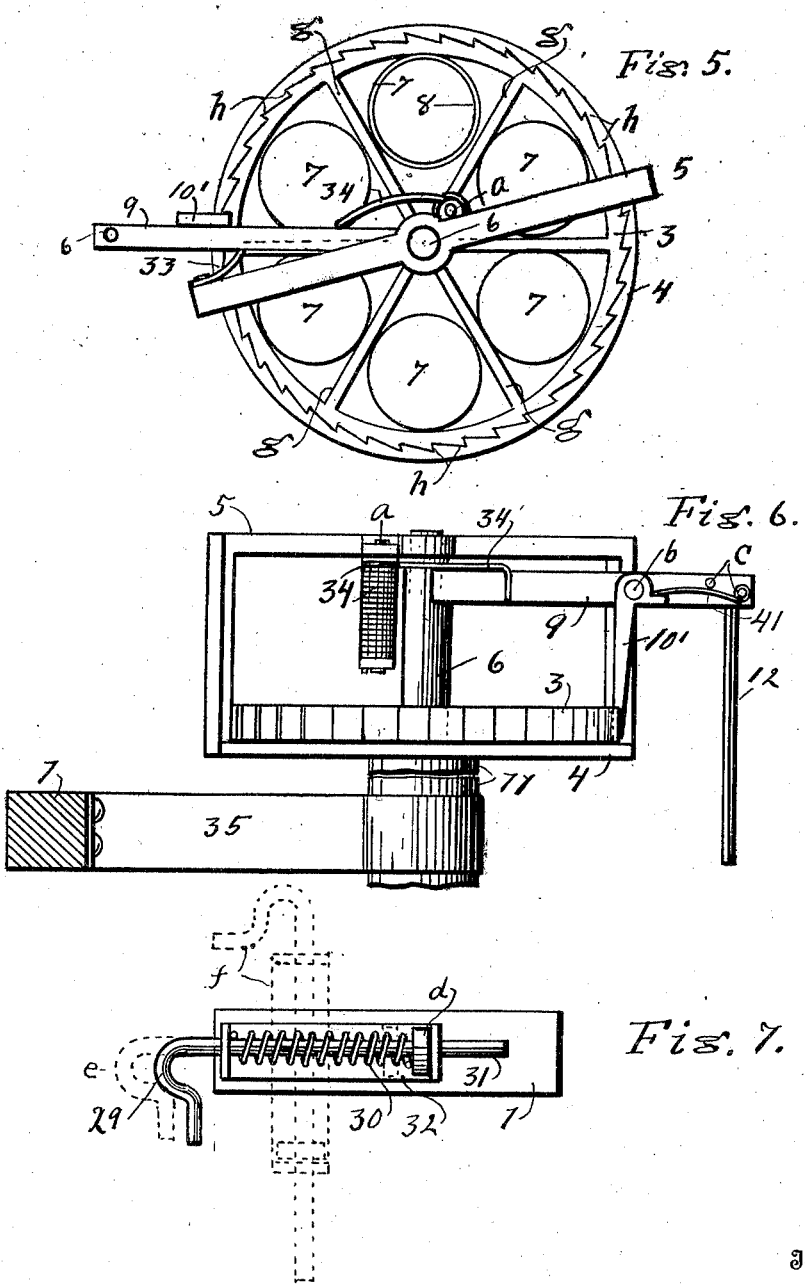
Inventor
George J. Smith,
By
Ithiel J. Cilley
Attorney

UNITED STATES PATENT OFFICE.

GEORGE J. SMITH, OF GRAND RAPIDS, MICHIGAN.

POTATO-PLANTER.

1,312,214.  Specification of Letters Patent.  Patented Aug. 5, 1919.

Application filed April 1, 1918.  Serial No. 226,110.

*To all whom it may concern:*

Be it known that I, GEORGE J. SMITH, a citizen of the United States, residing at Grand Rapids, in the county of Kent and State of Michigan, have invented certain new and useful Improvements in Potato-Planters, of which the following is a specification.

My invention relates to improvements in machines for planting potatoes, and its objects are: first to provide a machine of the kind with which the operator may ride upon the machine when planting; second, to provide a machine with which the furrows may be made for receiving the potato seed, the seed may be dropped and the furrow covered at the same time; third, to provide a machine of the kind mentioned with which the markings for succeeding rows of planting may be made at the same time that planting is being done; fourth, to provide a means on said machine whereby the depth of furrow may be readily regulated by the driver; fifth, to provide a means whereby the machine will operate the planting mechanism when moving forward, but will not operate this mechanism when backing the machine; sixth, to provide a means whereby the depth of covering over the potato seed may be readily regulated by the operator while operating the machine.

Figure 1:
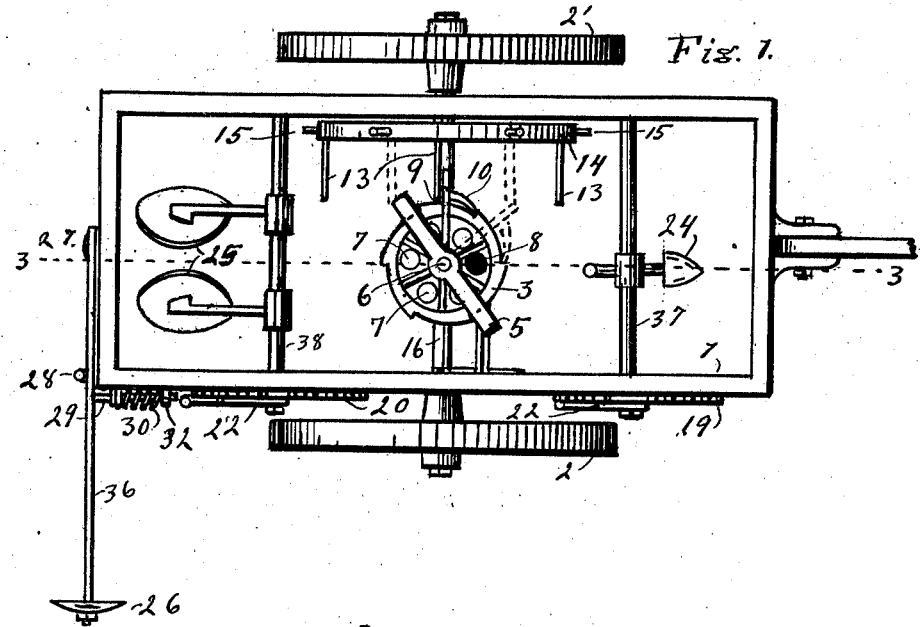
Figure 2:
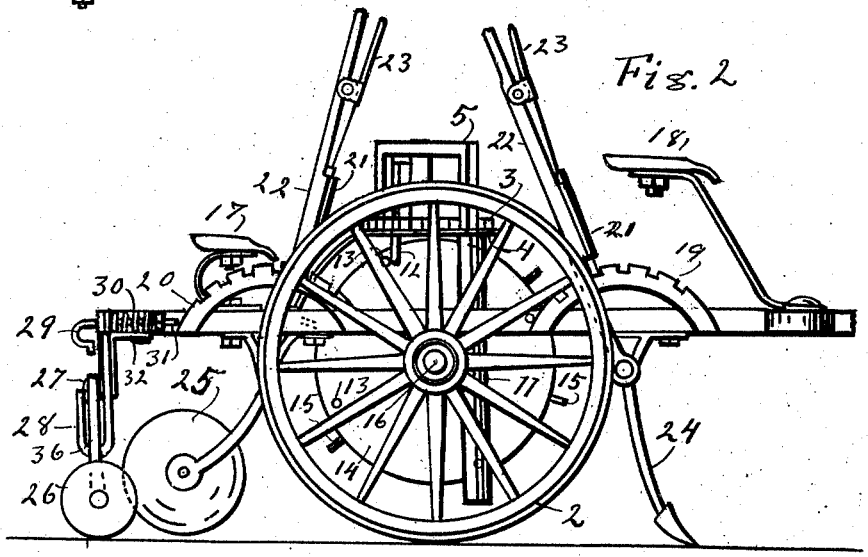

I attain these objects by the mechanism illustrated in the accompanying drawing, in which Figure 1 is a plan of the machine. Fig. 2 is a side elevation of the same. Fig. 3 is a sectional elevation of the machine on the line 3—3 of Fig. 1. Fig. 4 is an elevation of the back end of the machine. Fig. 5 is an enlarged plan of the feeding appliance. Fig. 6 is an elevation of the same, and Fig. 7 is an elevation of the latch that holds the marker off of the ground.

Similar reference characters indicate similar parts throughout the several views.

In the construction of this machine I use an ordinary frame or body 1 that is mounted upon wheels 2 and 2′. The wheel 2 is securely attached to the axletree 16 acting as a traction wheel to cause the axletree to revolve with it, while the wheel 2′ is loosely mounted upon the other end of the axletree so it may be made to revolve thereon independently of the axletree to facilitate turning the machine to the right or to the left, or turning it around to return to the end of the field upon an adjacent row.

The operative parts of this machine consist of the revoluble disk or feeder 3, mounted upon the post 6 so as to be readily made to revolve thereon upon the surface of the disk 4. The disk 3 is provided with several openings 7 through it upon the surface of the disk 4, which latter is stationary and is provided with a spout 11, forming an opening 8 through which pieces of potato seeds may be made to drop as they are carried around by the revoluble movement of the disk 3.

The disk 3 is made to revolve by means of an arm 9, that is secured, at one end, to the post 6, and provided, at the other end, with a downwardly extending rod 12 which is designed to be operated upon by the pins 13 on the disk 14. The arm 9 must be provided with some form of available pawl mechanism, as indicated at 10 or 10′. I prefer that shown at 10′ where the pawl is pivotally mounted upon the arm, as at $b$, and is held in contact with the ratchet teeth $h$ on the periphery of the feeding disk 3 by means of any available form of spring, as indicated at 41 in Fig. 6, held in operative position by the pin $c$, on the arm 9.

The upper end of the arm 9 is supported by the yoke 5, and is held in normal position by means of any available form of spring, as indicated at 34 in Fig. 6, where a helical spring is shown mounted upon a supporting rod $a$, and having an arm 34′ acting upon the arm 9.

The disk 14 is loosely mounted upon the axletree 16 and is actuated from the revolving axletree by means of a ratchet wheel 39 upon the axletree and a pawl 40 upon the disk, so that when the machine is moving forward and in condition for planting, the disk 14 will revolve with it and cause the pins 13 to engage the rod 12 and, through the action of the pawl 10 or 10′, or such pawl as may be used, engaging the teeth $h$ on the disk 3, the disk will be made to revolve and carry each of its openings 7, successively, over the opening 8 in the tube 11 so that any potato seed that may be placed into the openings 7, at any other point, will drop through the tube in position to be properly planted. The yoke 5 is mounted upon the plate 4, and the whole may be supported upon the frame 1 in any available manner, as with the bracket 35, shown in Fig. 6.

It is necessary to provide some means for properly placing and covering the seed, and means to insure straight rows, properly spaced. For planting and covering the seed I use an ordinary drill tooth 24 for forming the furrow. This tooth is mounted upon the shaft 37 and so arranged that it may be raised and lowered, or swung upward and downward, for making a deep or shallow trench for the reception of the potato seed, by means of the lever 22 having a sliding pawl 21 actuated by the pawl lever 23 to engage with, or be disengaged from the segmental locking bar 19, as indicated by the dotted lines outlining the said levers and drill teeth in Fig. 2. The means for covering the potato seed after it has been dropped consists of an ordinary pair of narrow disks, 25, that are mounted upon the shaft 38, and are actuated by means of the lever 22′ the pawl 21′ and lever 23′ and the locking bar 20, exactly as the shaft 37 is actuated, as hereinbefore explained.

When planting with this machine it is better to have two operators, one seated upon the front seat, 18, to drive, and the other seated upon the back seat, 17, to handle the seed potatoes. The operator in the back seat places each piece of seed potato, separately into the several compartments, 7, in the disk 3 and the pieces are carried around to opening 8 where they drop through the tube 11 into the trench formed by the drill tooth 24, and the disks 25 are dropped downward far enough to carry sufficient soil over the trench to properly cover the potato seed therein. If it is desired to turn the disk 14 backward by hand it may be done by the proper use of the handles 15.

I have provided for marking for new rows of planting by means of a disk 26, mounted upon a rod 36, which latter is pivotally mounted upon the frame 1, as at 27, so the disk 26 may be readily adjusted to mark from either side of the machine. 28 represents a support for the rod 36, when in operation, to hold the disk 26 safely in proper position, and 29 represents a hook that may be used for holding the rod 36 out of working position, when desired. This hook is mounted upon a pivotal table 32, and has a collar $d$ near the projecting end 31 of the rod, to be acted upon by the spring 30 to hold the hook in normal position. This hook; and its pivotal supporting plate may be adjusted to various positions, as indicated by the dotted outlines $f$, and the hook may be extended as at $e$.

33 represents an available form of stop for the arm. The pieces of potato for seed are carried around with the disk 3 by means of the division arms $g$, shown in Fig. 5.

When starting the machine at the beginning of a new row to be planted, it is so positioned that the lower end of the tube 11 will be immediately over the point where the first hill of potatoes is to be planted, and in direct alinement with the first lateral row in the field, and the disk 14 is manually made to revolve, by the use of the handles 15, until the first hill is planted, or, in other words, until the opening 7 in the disk 3, which contains seed, comes directly over the opening 8 in the tube, when the machine is started forward in the regular course of planting, thus insuring lateral alinement, as well as direct alinement of the rows.

The distance apart of the hills in the direct rows may be governed by placing the pins 13 nearer to, or farther from the center of the disk 14, as, say, at 13′, where the arm 9 will be moved only one half as far as with the pins 13 in the position shown, thus requiring two revolutions of the wheels 2 to plant each hill, or doubling their distance apart. Thus, by varying the distance of the pins 13 from the center of the disk different spacings may be attained in the planting, or, in other words, the hills may be planted close together or farther apart.

What I claim as new in this art is:

1. In a potato planter, a carrying frame mounted upon two wheels, a revoluble axletree mounted in said frame and revolubly connected with one of the wheels, the other wheel revolubly mounted on said axletree, a disk loosely mounted on said axletree near one end inside of the frame, a pawl and ratchet so connecting the disk and the axletree that the disk will be made to revolve with the axletree when the machine is moving forward, and to stand idle when the machine is moving backward, pins projecting at right angles from one side of the disk, a feeding tube mounted upon the frame, a horizontal disk integrally mounted upon the upper end of the tube and having an opening into the tube for the passage of seed potato, a feeding disk revolubly mounted upon the stationary disk, and means connected with the feeding disk whereby it is actuated by the pins on the axletree mounted disk to carry potato seed to and drop it through the tube.

2. In a potato planter, a carrying frame mounted upon two wheels, one of said wheels mounted to force the axletree to revolve therewith, and the other wheel mounted to allow the axletree to revolve therein, a disk loosely mounted on the axletree, pins projecting at right angles from one side of the disk, a pawl and ratchet connection between the disk and the axletree arranged to cause the disk to revolve with the axletree when the machine is moving forward, and to revolve on the axletree when the machine is moving backward, a feeding tube mounted upon the frame, a horizontal disk mounted upon the upper end of the tube and having an opening into the tube, a revoluble disk upon the stationary disk, a shaft supporting said revoluble disk, an arm projecting at right angles from said shaft and so connected that the revoluble movement of the disk on the axletree will bring the pins in contact with said arm and cause the feed disk to revolve to carry potato seed into the tube.

3. In a potato planter, a supporting frame, an axletree revolubly mounted in said frame, a wheel securely mounted upon one end of the axletree, a wheel revolubly mounted upon the other end of the axletree, a disk revolubly mounted upon the axletree, pins extending from the surface of said disk, and arms radiating from the periphery of the disk, means for securing said disk upon the axletree to make it revolve with the axletree when the machine is moving forward and to stand motionless when the machine is moving backward, a feeding tube mounted upon the frame, a stationary horizontal disk mounted upon the upper end of the tube, a revoluble disk mounted upon the surface of the stationary disk and both disks provided with openings into the tube, a shaft carrying the revoluble disk, an arm projecting at right angles from the shaft, a rod extending at right angles from said arm into position to be engaged by the pins on the axletree disk, a pawl pivotally mounted upon said arm in position to engage the revoluble feed disk to cause the feed disk to revolve from the revoluble movement of the axletree disk, and means for carrying said arm back into normal position after each movement forward.

Signed at Grand Rapids, Michigan, March 27, 1918.

GEORGE J. SMITH.

Copies of this patent may be obtained for five cents each, by addressing the "Commissioner of Patents, Washington, D. C."